United States Patent [19]

Hahnke et al.

[11] 4,020,037

[45] Apr. 26, 1977

[54] PROCESS FOR THE SPIN-DYEING OF POLYMERS OR COPOLYMERS OF ACRYLONITRILE

[75] Inventors: Manfred Hähnke, Kelkheim, Taunus; Theodor Papenfuhs, Frankfurt am Main; Wolfgang Teige, Kelkheim, Taunus, all of Germany

[73] Assignee: Hoechst Aktiengesellschaft, Frankfurt am Main, Germany

[22] Filed: Nov. 26, 1974

[21] Appl. No.: 527,414

[30] Foreign Application Priority Data

Nov. 29, 1973 Germany ............................ 2359466

[52] U.S. Cl. .............................. 260/42.21; 8/162 S; 260/30.8 DS; 260/32.6 N; 264/78; 264/182

[51] Int. Cl.² .................... C08K 5/00; C08L 33/20; D01F 1/06

[58] Field of Search ............... 260/30.8 DS, 32.6 N, 260/37 N, 42.21; 264/78, 182; 8/162 S

[56] References Cited

UNITED STATES PATENTS

| | | |
|---|---|---|
| 3,242,243 | 3/1966 | Knudsen .............................. 264/78 |
| 3,253,880 | 5/1966 | Lawson et al. ..................... 8/168 A |
| 3,402,014 | 9/1968 | Ucci ..................................... 264/78 |
| 3,575,944 | 4/1971 | Stroh .................................... 264/78 |

OTHER PUBLICATIONS

"Chemistry of Synthetic Dyes," Venkataramen, vol. II, 1952, pp. 708 and 709.
Kirk–Othmer, "Encyclopedia of Chemical Technology," 2nd Edition, vol. 20, p. 694.
Burnthall, American Dyestuff Reporter, Sept. 2, 1963, p. 35.

*Primary Examiner*—Allan Lieberman
*Attorney, Agent, or Firm*—Connolly and Hutz

[57] ABSTRACT

The novel improved process of the invention for spin-dyeing of acid-modified polymers or copolymers of acrylonitrile with basic dyestuffs wherein the spinning solutions of the polymers contain the basic dyestuffs in form of their free dyestuff bases as anhydro or carbinol bases is conducted with completely transparent spinning solutions avoiding clogging and mechanical abrasion of the spinning nozzles and yields filaments and fibers which do not show matting effects but have a high tinctorial strength and good and improved fastnesses to rubbing, to light and to wet-processing.

2 Claims, No Drawings

PROCESS FOR THE SPIN-DYEING OF POLYMERS OR COPOLYMERS OF ACRYLONITRILE

The present invention concerns an improved process for spin-dyeing of acid-modified polymers or copolymers of acrylonitrile using basic dyestuffs.

It is already known to dye polymers or copolymers of acrylonitrile with organic or inorganic color pigments in the spinning mass. But the use of such color pigments in the spinning mass has some disadvantages; when spinning it is almost a rule that a clogging or a mechanic abrasion of the spinning nozzles and the resulting imprecise titer cannot be avoided. Furthermore color pigments cannot always be prepared in a steady quality as far as their fine dispersion is concerned. Other considerable inconveniences may occur when using them due to dust development, for example when adding them to the spinning mass.

It is furthermore well known to dye polymers or copolymers of acrylonitrile in the mass by adding complex compounds composed of heteropoly acids and basic dyestuffs, to the spinning solutions (see French Pat. specification No. 1,068,382) or by using basic dyestuffs which had been precipitated from their aqueous solutions with the aid of sulfonic acids (see German Pat. specification No. 1,077,372). Nevertheless, the use of such dyestuffs has the disadvantage thay they present only a weak tinctorial strength due to their high amount of anions although those are colorless.

The present invention concerns an improved process for the spin-drying of polymers or copolymers of acrylonitrile by the use of basic dyestuffs in the form of their anhydro base or carbinol base. These forms, using triphenylmethane as an example, are illustrated in Kirk-Othmer (volume 20, page 694) where the carbinol base is shown and the anhydro base is designated as "imine base (Homolka's base," as well as in Ven-Kataramen (volume II, 1952, page 708) where the carbinol form is also shown, and the anhydro form is designated as "Homolka's base." Preference is given to the bases of dyestuffs which are only sparingly soluble or insoluble in water even as salts of strong acids.

As dyestuffs used according to the invention there may especially be cited those which belong to the triarylmethane, indoldiarylmethane, azine, oxazine, thiazine, acridine or xanthene series. Such dyestuffs which may be converted from their salts by reaction with alkalis such as for example, sodium hydroxide solution, potassium hydroxide solution, sodium carbonate or ammonia or other comparable strong organic amines into the carbinol or anhydro bases, are described, for example, in the German Pat. Specifications Nos. 949,649, 1,161,370, 1,161,371, in the French Patent Specifications Nos. 1,553,149, 1,560,192, 2,030,081, 2,024,450, 2,099,211, 2,121,198, in the Belgian Pat. Specifications Nos. 775,141, 761,851, 782,681, as well as in Swiss Pat. Specifications Nos. 519,552, 521,418 and 522,022. Especially suitable are those dyestuff bases which contain arylamino groups in the molecule as they are generally sparingly soluble in water and can therefore easily be isolated after their preparation.

Especially suitable for their application in the process of the invention are the triphenylmethane, xanthene and oxazine dyestuffs.

The preparation of the dyestuff bases of the invention is effected according to generally known methods, for example, by adding at least equivalent amount of alkali to the solution of the dyestuff salt in a water-miscible organic solvent; and after the formation of the dyestuff base is finished, this reaction solution is poured into water, and the dyestuff base precipitates. The conversion with alkali can eventually be effected also in water, especially when a dyestuff salt is used which is at least partially soluble in water, according to a further known process, the conversion of the dyestuff salt is effected with an aqueous alkali and a suitable water-immiscible organic solvent in two phases, whereby the dyestuff base can be isolated by concentration of the separated organic phases. Some of the dyestuffs used in the invention can directly be obtained in the course of their synthesis in the form of their dyestuff base.

The process of the invention can be effected so that the dyestuff bases are dissolved in the solvent used for the dissolution of polyacrylonitrile such as, dimethylformamide, dimethylacetamide or dimethylsulfoxide, and are added to the spinning solution; the mixture is homogenized and spun in the usual was as, for example, according to the wet spinning process but preferably according to the dry spinning process; subsequently the so prepared fibres are after-treated in the usual manner.

The dyestuff bases of the invention used present a very high solubility in the beforementioned solvents, even at room temperature; so that they can advantageously be used in the form of concentrated solutions which contain preferably about 10 to 30% by weight of the dyestuff base. If desired, solubility of the dyestuff bases can increase considerably by raising the temperature.

Beside the polymers of acrylonitrile, copolymers of acrylonitrile with other vinyl compounds such as, for example, vinyl chloride, vinyl fluoride, vinylidene chloride, vinyl acetate or propionate, vinyl pyridine, vinyl imidazole, vinyl pyrrolidone, vinyl alcohol, acrylic or methacrylic acid esters or acrylamides may be used, whereby these copolymers must have at least 70% by weight of acrylonitrile and contain furthermore acid groups which are introduced as terminal groups into the polymer by means of a catalyst or are incorporated by polymerisation or grafted upon by means of comonomers containing such acid groups.

According to the process of the invention the formation or the presence of foreign salts is avoided, and completely transparent spinning solutions which are free from specks are obtained; they do not provoke any clogging or mechanical abrasion of the spinning nozzles. The filaments and fibres resulting from the spinning process present no matting effects due to an almost molecular dispersion of the dyestuffs used according to the invention contrary to the color pigments actually applied. Furthermore the materials dyed with the dyestuff bases by the process according to the invention possess a very high fastness to wetprocessing.

Due the the lack of dyestuff aggregates on the fibre surfaces as they may appear in spin-dyeing with color pigments, the fibres of the invention present also an outstanding fastness to rubbing. Furthermore, the improved fastness to light of the fibres dyed according to the process of the invention, has to be underlined as it is evidently higher as compared to fibres, which are dyed by applying the dyestuff from an aqueous dyeing bath in a usual and suitable manner on the colorless polymer material.

The utilization of carbonol or anhydro bases of triphenylmethane, indolediphenylmethane, xanthene, oxazine and azine dyestuffs in the process of the invention is a preferred embodiment of this invention, especially the use of dyestuffs of the general formulae (I) and (II)

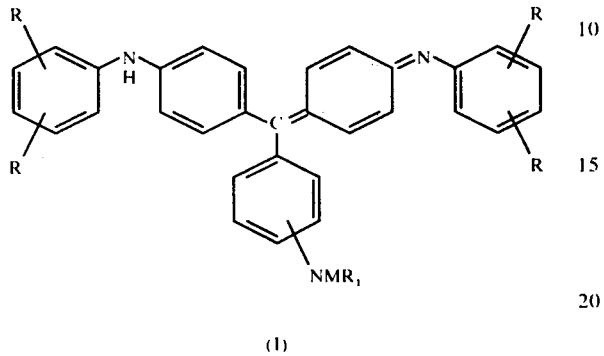

(I)

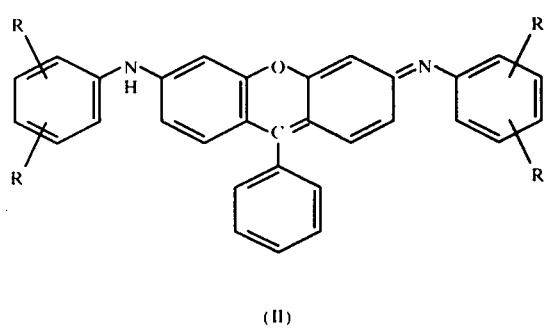

(II)

wherein $R_1$ represents a hydrogen atom or the radical of the formula

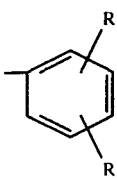

in which the substituents R are identical or different and wherein each R represents a hydrogen or chlorine atom, a methyl, ethyl, methoxy, or ethoxy group.

The following examples illustrate the process of the invention. The parts represent parts by weight, the indications in percentage represent percentages by weight.

EXAMPLE 1

2.8 parts of a 10% solution of a dyestuff base corresponding to the formula

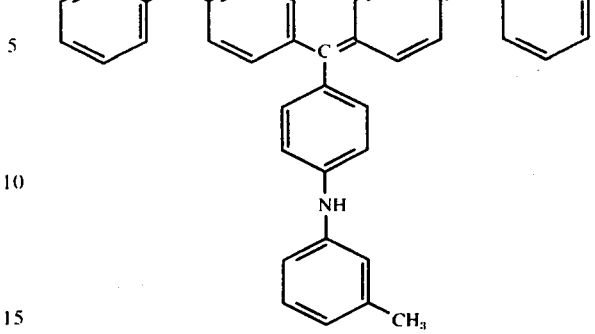

in dimethylformamide were added immediately before the spinning to 100 parts of a 28% solution of an acid-modified polyacrylonitrile in dimethylformamide by means of adequate dosing pumps. By means of a mechanically or statically operating mixer the solution to be spun was homogenized. Afterwards the solution was spun according to a dry-spinning process generally known and used in the art.

The above-mentioned dyestuff base was obtained after a two hours' boiling of a mixture consisting of 1 part of its hydrochloric acid compound, of an equivalent amount of sodium hydroxide and 5 parts of ethanol; and subsequently pouring the mixture into 10 parts of an ice water mixture and separating the precipitated dyestuff base by filtration.

The so-obtained fibre or filament material presents a brilliant reddish blue shade of a high color depth (intensity) and excels additionally by its very good fastnesses, especially to wet-processing, to rubbing, to sublimation and to cross-dyeing.

EXAMPLE 2

1,5 parts of a dyestuff base of the formula

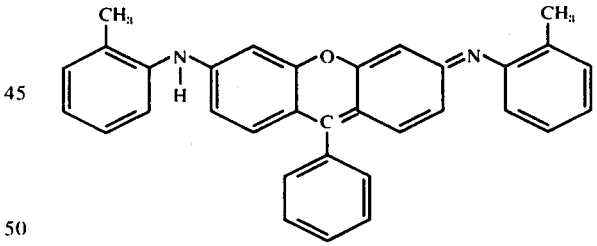

were dissolved in 770 parts of dimethylformamide at room-temperature and under stirring. To this solution 300 parts of an acid modified polyacrylonitrile were added which was dissolved under heating up to 80° C and under constant stirring. The so obtained red-violet spinning solution was filtrated and spun according to a dry-spinning process generally known and used in the art.

The so obtained fibre-or filament material presents an intense red-violet shade of high tinctorial strength and of excellent fastness properties especially of a very high fastness to light as well as of fastness to wet-processing, to sublimation, to rubbing and to cross-dyeing.

The following table contains further dyestuffs suitable and used in the process of the invention as well as the shades obtained on acid modified polyacrylnitrile fibres; their corresponding carbinol bases may also be used instead of the anhydro bases of the dyestuffs listed in the Table.

| EXAMPLE | DYESTUFF | SHADE |
|---|---|---|
| 3 | phenyl-NH—[xanthene core, 9-phenyl]—N=phenyl | dull violet |
| 4 | (2-CH₃, 6-Cl-phenyl)-NH—[xanthene, 9-phenyl]—N=(2-CH₃, 6-Cl-phenyl) | brilliant blueish red |
| 5 | (2,6-di-CH₃-phenyl)-NH—[xanthene, 9-phenyl]—N=(2,6-di-CH₃-phenyl) | brilliant blueish red |
| 6 | (4-NH₂-phenyl)₂C=(C₆H₄=NH), with 9-(4-NH₂-phenyl) | brilliant blueish red |
| 7 | (4-NH₂-phenyl)₂C=(C₆H₄=N-phenyl), with 9-(4-NH₂-phenyl) | brilliant reddish violet |
| 8 | (4-anilino-phenyl)₂C=(C₆H₄=N-phenyl), with 9-(4-NH₂-phenyl) | brilliant blueish violet |

-continued

| EXAMPLE | DYESTUFF | SHADE |
|---|---|---|
| 9 | (structure) | brilliant violet |
| 10 | (structure) | brilliant neutral blue |
| 11 | (structure) | blueish green |
| 12 | (structure) | green |
| 13 | (structure) | brilliant blueish red |
| 14 | (structure) | brilliant yellowish red |

-continued

| EXAMPLE | DYESTUFF | SHADE |
|---|---|---|
| 15 | | violet |
| 16 | | blue |
| 17 | | blue |
| 18 | | blue |
| 19 | | dark blue |
| 20 | | dark blue |
| 21 | | blue |
| 22 | | blue |

| EXAMPLE | DYESTUFF | SHADE |
|---|---|---|
| 23 | | blue |
| 24 | | reddish blue |
| 25 | | violet |

We claim:

1. In a process of spin-drying of acid modified polymers or copolymers of acrylonitrile with vinyl compounds selected from the group consisting of vinyl chloride, vinyl fluoride, vinylidene chloride, vinyl acetate, vinylpropionate, vinyl pyridine, vinyl imidazole, vinyl pyrrolidone, vinyl alcohol, acrylic acid esters, methacrylic acid esters and acrylamides these copolymers containing at least 70% by weight of acrylonitrile and acid groups, with basic dyestuffs selected from the group consisting of the triarylmethane, indoldiarylmethane, azine, oxazine, thiazine, acridine and xanthene series, by means of spinning solutions of the polymers containing the basic dyestuff, the improvement consisting of using the dyestuff in the spinning solution in the form of its imine base or carbinol base.

2. A process as claimed in claim 1 wherein the dyestuff used is a dyestuff of the formula

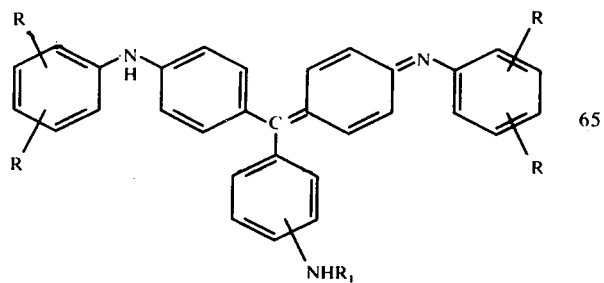

or

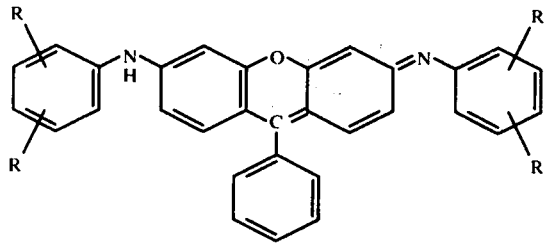

in which $R_1$ is hydrogen or the radical of the formula

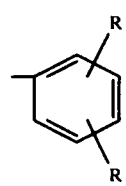

in which the substituents R are identical or different and each R is hydrogen, chlorine, methyl, ethyl, methoxy or ethoxy.

* * * * *